INVENTORS
*D.H. McCLELLAND*
*H.G. PANKOW*
*E.O. WOLCOTT*

BY: *Curtis H. Castleman Jr*

United States Patent Office 3,704,173
Patented Nov. 28, 1972

3,704,173
TERMINAL SEAL ELECTROCHEMICAL DEVICE
Donald H. McClelland, 6160 Rosewood Drive; and Herbert G. Pankow, 6017 S. Elizabeth Way, both of Littleton, Colo. 80121; and Edward O. Wolcott, 8425 W. 3rd Place, Denver, Colo. 80226
Filed Oct. 7, 1970, Ser. No. 90,178
Int. Cl. H01m 1/02
U.S. Cl. 136—135 R
18 Claims

ABSTRACT OF THE DISCLOSURE

An electrochemical device having a resilient, electrolyte resistant inner lining and top (e.g. of plastic) and connections between the electrodes of the device through the inner top to the device terminals which are sealed by a compression fit between the terminal connecting post and resilient inner top. A hole or port in the resilient member at the point of connection carries the terminal connecting post which consists of a hollowed-out deformable electrical conductor (e.g. of lead). This deformable post is made to expand against the plastic lining to form a liquid seal compression fit. The expansion may be provided, inter alia, by an externally expanded rivet or by the action of a self tapping screw. This seal has particular utility in sealed or resealably safety valved battery and other electrolytic cells.

CROSS REFERENCES TO RELATED APPLICATIONS

U.S. copending patent application S.N. 62,227, filed Oct. 3, 1970 and assigned to the assignee to the present invention relates to the general field of the present invention, is hereby incorporated by reference and describes a novel maintenance-free lead-acid battery and process for making the same, in which the seal of the present invention may be utilized advantageously.

BACKGROUND OF THE INVENTION

This invention relates to an internal seal for an electrolytic device such as a sealed battery cell capable of omnipositional use and storage.

One of the basic problems in electrolytic manufacture and use is leakage of electrolyte through the cell package. This is particularly true in battery cells which are of the so-called sealed variety in which the cell may be used in any desired position. While the problem of leakage has been more or less solved in the case of primary cells, secondary cells of the type exemplified by nickel-cadmium, silver-zinc and lead-acid present unique engineering design problems for overcoming leakage. Because of the repeated charge/discharge cycles, varying attitude and long use to which these secondary cells are put, more reliable sealing means are required to prevent electrolyte leakage than in customary dry cells and non-maintenance-free cells, as typified by the automobile storage battery.

This leakage problem is particularly significant in the maintenance-free lead-acid battery. The sulfuric acid electrolyte employed in these batteries is particularly corrosive so it has been customary to envelop the cell pack with an acid resistant lining. However, leakage around the lead post connections through the lining top has been prevalent, particularly due to high wettability of the lead by acid electrolyte. Normal sealants used in lead-acid storage batteries are generally inadequate for use in maintenance-free lead-acid batteries for at least the following reasons: first, the acid electrolyte tends to attack the interface between the lead terminal and its immediately contiguous oxide layer, thus bypassing and avoiding the sealant which is merely in contact with the lead oxide coating, allowing leakage; and secondly, it is very difficult, if not impossible, to obtain an adhesive which bonds both lead and a resilient material such as plastic, and additionally be acid resistant.

It is a primary object of the present invention to overcome disadvantages of the prior art and provide a reliable liquid seal for electrolytic devices.

It is another object to provide a compression fit liquid seal between a deformable metal electrical connector and a resilient material contiguous thereto.

It is another object to provide a sealed terminal connector having very low internal electrical resistance.

It is a further object of this invention to provide the sealing means with a minimum of effort and materials and yet have high reliability.

These and other objects of the invention are met by the present invention which is more particularly described hereinafter.

SUMMARY OF THE INVENTION

Briefly described, the invention includes a resilient seat member housing a deformable electrically conductive connector (e.g. a lead post connector) in intimate compressive contact produced by expanding the deformable connector against the resilient seat. The connector may be radially and axially deformed by the use of an externally expanded rivet, self-tapping screw, etc. In the case of a battery, the resilient member (e.g. plastic) forms a barrier to electrolyte and provides means for the electrical communications from the electrodes of the battery eventually to the battery terminals for use. The sealing configuration of the present invention has particular utility in a maintenance-free lead-acid cell in which the resilient member forms an inner top which is acid resistant and prevents external leakage particularly to outer metallic parts of the cell susceptible to corrosion.

BRIEF DESCRIPTION OF THE DRAWINGS

The invention will be better understood by reference to the accompanying drawings, in which.

PREFERRED EMBODIMENTS OF THE INVENTION

Figure 1:
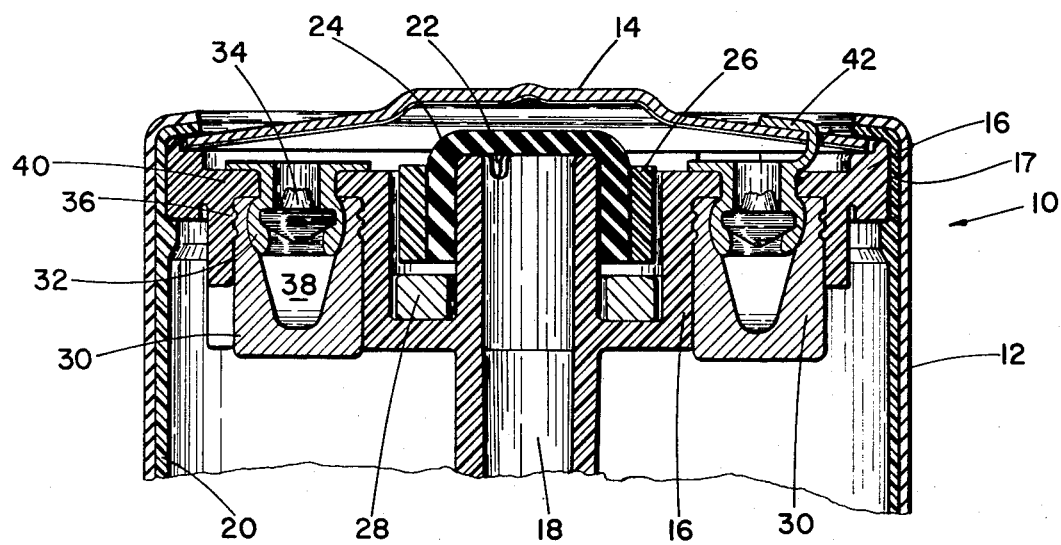
FIG. 1 is a sectional view of the top portion of a sealed battery depicting the novel seal of the present invention in relation to proximate parts of the battery.

This invention is applicable to primary and secondary batteries, fuel cells and the like, which are vented, resealably safety valved and hermetically sealed, but is most preferably adapted to sealed (including safety valved) batteries in which leakage of electrolyte from the electrode pack area to the battery terminals through internal top connections occurs. Examples of cell types in which the present invention is applicable include Le Clanche cells, fuel cells, conventional sealed nickel-cadmium cells, silver-zinc cells, nickel-zinc cells, and lead-acid cells.

The seal of the present invention is between a deformable body (e.g. a soft metal post connector) and a resilient member enveloping at least a portion of the surface of the deformable body. The resilient member should be of sufficient rigidity to deform lead or other deformable body according to this invention upon radial expansion. The material should also be resilient enough to bias the deformable material in a mutually pressure exerting condition. If the material lacks sufficient resiliency, it may tend to "cold flow," i.e. a phenomenon of outward creeping of the resilient member resulting in a relief of pressure and eventual loss of the necessary compression. While a certain amount of cold flow is tolerable, excessive creeping breaks the seal.

The resilient member should also be compatible with the electrolyte of the cell. The resilient member acts as a guide or seat having apertures or ports of a cylindrical or other shape to accommodate the deformable member. Thus, many molded, machined or otherwise fabricated plastics or rubbers are preferred. Examples of useful plastic materials include polypropylene oxide, polysulfone, a variety of polyolefins such as polyethylene and polypropylene, polyurethane, polystyrene, polymers of styrene-butadiene, ABS (copolymers of acrylonitrile, butadiene and styrene), chlorinated polyvinyl chloride, ABS modified polyvinyl chloride, polypropylene modified polyvinyl chloride, a variety of polyesters, acrylics, phenoxy compounds, chlorinated polyethers, phenolic resins, and melamine resins. A number of natural and synthetic rubbers are also useful, exemplified by hard rubbers, thiokol, butyl rubbers and neoprene.

The deformable body serves as a connection between the battery pack electrodes and leads on the one hand, and the terminal connections (e.g. battery top and can) on the other hand. Since this deformable member forms a portion of the electrical circuitry of the cell, it preferably is a good electrical conductor. Examples of useful materials include soft copper, sodium, lead, and nickel and suitable alloys thereof. Preferably, the deformable body has a recess or cavity approximately along its axis to accommodate radial expanding means.

According to this invention a force is used to expand and hold the deformable body in pressure relation to the resilient seat. The force may be exerted in a radial direction, axial pull, or combinations thereof. A preferred method of accomplishing such expansion is effected by the use of externally expanded open or closed end blind or "pop-rivets" (a registered trademark of the USM Corp.). This type of rivet is well-known in the art (see for instance "Pop" rivets, catalog SL–190 and Flush-Break "Pop" rivets, catalog SL–201, USM Corporation, 1969 and "Blind Rivets" catalog of the Scovill Closure Division Co.). These rivets have a high grip strength, low head profile and controlled radial expansion which prevents fracture in a plastic to metal compression fit. In addition, the closed-end blind rivet type seal as they set and may be used when vapor and liquid tightness is required. In a preferred embodiment of this invention, a metal conductive tab is welded to or made an integral part of the rivet body so that upon installation the conductive tabs are available for terminal connections. The rivet body is preferably of a conductive metal compatible with the deformable member with which it is in contact. For instance, when the deformable member is lead it is preferred to use a tin, lead, silver, terne plate, solder, mercury, bismuth, zinc, cadmium, nickel, gold, brass, copper or other compatible coating material including certain alloys thereof. Usually the coating is of a soft metal. Preferably the material is mutually miscible with the lead body in which it is in contact.

Various other means may be employed to accomplish the desired expansion against the deformable body. For instance, a self-tapping screw is useful. A highly compressed stiff spring inserted horizontally in a recessed seat of the deformable body is another useful means.

The invention will be more particularly understood by reference to the accompanying drawings which depict certain preferred but non-exclusive embodiments of the invention. In the several drawings like numerals designate like parts.

In FIG. 1 the upper portion of a maintenance-free lead-acid battery 10 is shown having a container 12, outer top 14, and a polypropylene liner 20 bonded along interface 17 to a polypropylene injection molded inner top 16. This plastic top is provided with a central vent cylindrical portion 18 and notch 22 for release of excessive gas pressure that may develop in the cell. The rubber safety relief valve 24 tightly fits over the central vent and is compressed inwardly by ring 26 which is optionally employed. The valve automatically reseals upon discharge of the excess pressure. In case any electrolyte escapes through the relief valve means, it may be neutralized by a suitable material such as carbonate pill 28.

Figures 2, 3:
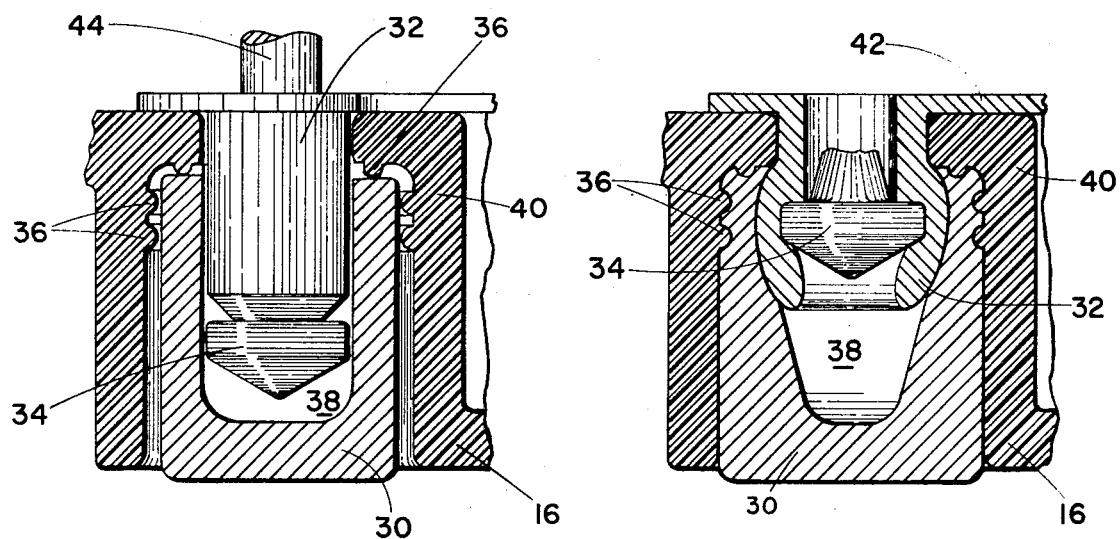
FIG. 2 is an enlarged partial sectional view illustrating the use of an externally expanded open-end blind rivet.
in FIG. 3 the rivet of FIG. 2 is shown in set position.

FIG. 2 shows an enlarged view of lead post connector 30 having a cavity or hollowed portion 38 carrying blind rivet 32. The connector is more or less snugly fit in resilient body 16 against seat 40. The resilient body has ridges 36 to hold the unexpanded rivet body 32 in place when it is eventually set as shown in FIG. 3. The unexpanded open-end blind rivet is made of tin-plated steel and has a head 34 enclosed in body 32, and axially connected to an elongated mandrel 44. The rivet is set externally by a mandrel extractor which engages the mandrel 44 and may be triggered manually. The head of the rivet 34 is pulled upwardly as shown in FIG. 3, expanding the rivet body 32 to bias the deformable lead connector 30 against the resilent propylene member 16. The mandrel is severed from the head 34. Solid core mandrel type blind rivets may also be employed to give additional strength. Positive conductive tab 42 is attached to the rivet and spot welded to the battery top 14. The negative conductive tab is connected to the cell container 12 (not shown). Leads of lead (not shown) preferably extend from the base of the respective negative and positive connector posts 30 to the electrodes (also not shown) within the cell.

When the rivet is expanded deformable body 30 is urged against and intimately follows the inner contour of the resilient member 16. Means other than ridges 36, for instance a key, may be employed to tightly engage the deformable body against the resilient member to prevent relative movement therebetween once the rivet is set.

Figure 4:
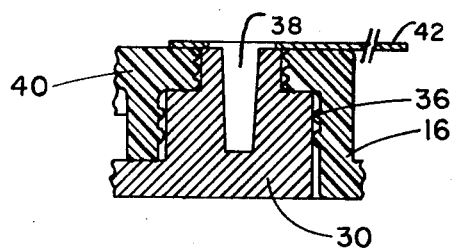
FIGS. 4 and 5 depict in section the use of a self-tapping screw as expander according to the present invention before and after engagement of the screw, respectively.
Figure 5:
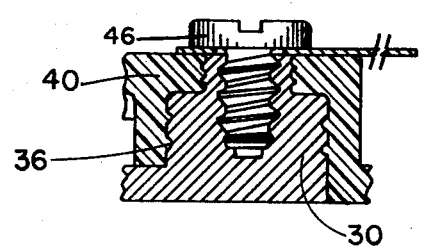

In FIG. 4 an alternative embodiment is shown in which lead body 30 and propylene member 16 with ridges 36 are shown prior to deformation of the lead body. Expansion is provided to deform the lead as shown in FIG. 5 by engagement of self-tapping screw 46.

Figure 6:
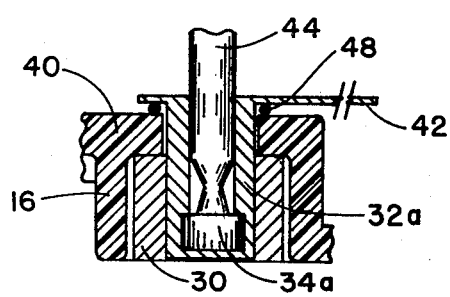
FIGS. 6 and 7 show in section the use of a closed end blind rivet before and after setting of the rivet, respectively.
Figure 7:
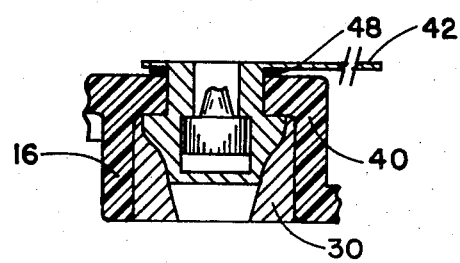

Another embodiment of the invention is shown in FIG. 6 in which a closed end blind rivet having head 34a, rivet body 32a and terminal connector tab 42 are inserted in deformable lead ring post 30 which is in turn seated in propylene top 16. For added sealing (not required), O-ring 48 is placed between the polypropylene top and the connector tab portion of the pop rivet. FIG. 7 shows the seal of FIG. 6 after the rivet has been set. The closed end blind rivet forms a liquid tight seal between itself and the contiguous lead post.

Figure 8:
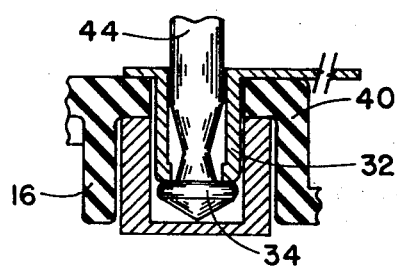
FIGS. 8 and 9 depict in section a slight modification of the seal of FIGS. 2 and 3.
Figure 9:
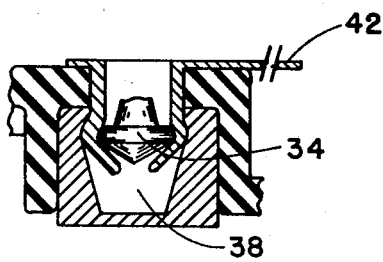

In FIGS. 8 and 9 essentially the same embodiment of the invention is depicted as shown in FIGS. 2 and 3 except that the protruding ridges 36 are omitted.

Sealed connections according to the present invention have been repeatedly tested and found to be substantially leakproof. One particular advantage of these connections is their low internal electrical resistance, which in the case of lead connectors is generally less than about one milliohm and usually less than one-half milliohm, when a tin-plated steel blind rivet is the expanding means employed.

It should be understood that the invention is capable of a variety of modifications and variations which will be made apparent to those skilled in the art by a reading of the specification and which are to be included within the spirit of the claims appended hereto. For instance, traditional means of obtaining a seal for a metallic conductor connection such as by the use of an O-ring or other elastomeric material such as a rubber sleeve between the resilient member and deformable body, as well as by the use of a sealant in certain instances (but probably not in lead-acid cells) could be used in addition to the apparatus of the present invention. Furthermore, the invention can be thought of as a general method for sealing the interface between a resilient member and a deformable member, having applications in apparatus other than just battery cells, such as in an hermetically sealed motor, electrodeposition tanks and other electrolytic devices.

What is claimed is:

1. In a lead-acid battery cell having a container, a plastic lining within the container, an enclosed cell plate and separator sub-assembly, means for collecting current from the sub-assembly, a plastic lid seat having apertures therein and sealed to said plastic lining and having connecting means for communicating electric current derived from said current collection means through the plastic lid, the improvement comprising in combination with said cell, sealed terminal connections comprising:
lead post connectors fitting in apertures in said plastic lid, the connectors having an upper hollowed out portion and an expandible body composed of a conductive material compatible with lead and contained in said hollowed out portion of each lead connector, said expandible body having undergone expansion internally within said expandible body and actuated from one side of said plastic lid seat, thereby deforming the lead connector biasing it outwardly against the plastic lid seat forming a sealed terminal connection.

2. The terminal connector of claim 1 wherein the expandible body is comprised of a conductive metallic material plated with a compatible electrical conductor.

3. The terminal connector of claim 2 wherein the expandible body is selected from the group consisting of closed-end and open-end blind rivets.

4. The terminal connector of claim 1 wherein the plastic lid is compatible with the acid electrolyte and has sufficient rigidity to tightly constrain the deformed lead connector.

5. The terminal connector of claim 1 wherein the plastic lid seat is selected from the group, consisting of polyolefins, polystyrene, polycarbonate, chlorinated polyethers, copolymers of acrylonitrile, butadiene and styrene, polyvinyl chloride, polysulfones, and polyphenylene oxide.

6. The terminal connector of claim 1 wherein the electrical resistance of the terminal connector is less than about one milliohm.

7. The terminal connector of claim 3 wherein the head of the rivet is comprised of a metallic conductive tab for connection to a battery terminal.

8. The terminal connector of claim 1 wherein the sub-assembly current collection means and the lead post connectors are connected by spot-welded lead leads.

9. The terminal connector of claim 3 wherein the blind rivet is set by an externally expanded mandrel extractor type.

10. The terminal connector of claim 5 wherein the plastic lid is composed principally of polypropylene.

11. The terminal connector of claim 1 wherein the hollowed out portion of the lead connector extends completely axially through the connector.

12. The terminal connector of claim 1 wherein the lead connectors and plastic lid seat are separated by a hermetically sealing gasket.

13. The terminal connector of claim 11 wherein the expandible body is a closed-end blind rivet.

14. A seal for connections between the electrodes and terminals of an electrolytic device comprising:
a resilient seat member containing apertures for terminal connections;
a deformable electrically conductive material seated in the apertures of said resilient member, said deformable material containing holes or hollowed out portions; and
an expandible conductive body contained within said hole or hollowed portion of said deformable material, said expandible body having undergone expansion to bias the deformable material against the resilient seat member to form the seal.

15. A seal for connections between the electrodes and terminals of an electrolytic device comprising:
a resilient seat member containing holes for terminal connections;
a deformable electrically conductive material seated in the holes of said resilient member; and
a self-tapping screw axially disposed within said deformable material, said screw having been axially engaged in said deformable material to thereby bias the deformable material against the resilient seat member to form a liquid seal therebetween.

16. A seal for connections between the electrodes and terminals of an electrolytic device comprising:
a resilient seat member containing holes for terminal connections;
a deformable electrically conductive material seated in the holes of said resilient member; and
a "blind" rivet housed in a hollowed out or hole portion of said deformable material, said rivet having been made to expand by external means to thereby bias the deformable material against the resilient seat member to form a liquid seal therebetween.

17. A process for obtaining a liquid tight seal between a plastic container and a deformable lead electrical connector extending through and supported by said container, comprising:
hollowing out at least a portion of the connector to form a seat;
disposing a conductive metal piece in said seat; and
expanding from internally within the seat said metal piece to thereby deform the lead connector and tightly bias the same against the plastic container to form the liquid seal.

18. The process of claim 17 wherein the expanding step is produced by an expanding force having radial and axially upwardly components of force with respect to said hollowed seat.

References Cited

UNITED STATES PATENTS

| 2,862,039 | 11/1958 | Ensign et al | 136—133 |
| 3,042,734 | 7/1962 | Carmichael et al. | 136—133 |
| 1,193,358 | 8/1916 | Carpenter | 136—168 |
| 1,380,061 | 5/1921 | Hazelett | 136—168 |

DONALD L. WALTON, Primary Examiner

U.S. Cl. X.R.

136—168; 85—74; 292—314; 339—220 R